(12) United States Patent
Schlepple et al.

(10) Patent No.: US 11,747,566 B2
(45) Date of Patent: Sep. 5, 2023

(54) COUPLING MULTIPLE OPTICAL CHANNELS USING A Z-BLOCK

(71) Applicant: Cisco Technology, Inc., San Jose, CA (US)

(72) Inventors: Norbert Schlepple, Macungie, PA (US); Jock T. Bovington, La Mesa, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/660,993

(22) Filed: Apr. 27, 2022

(65) Prior Publication Data

US 2022/0252789 A1  Aug. 11, 2022

Related U.S. Application Data

(62) Division of application No. 17/074,539, filed on Oct. 19, 2020, now Pat. No. 11,347,003.

(51) Int. Cl.
| | |
|---|---|
| *G02B 6/293* | (2006.01) |
| *H04J 14/02* | (2006.01) |
| *G02B 6/42* | (2006.01) |

(52) U.S. Cl.
CPC ....... *G02B 6/2938* (2013.01); *G02B 6/29368* (2013.01); *G02B 6/4215* (2013.01); *H04J 14/0254* (2013.01)

(58) Field of Classification Search
CPC .......... G02B 6/43; G02B 27/14; G02B 6/293; G02B 6/34; G02B 6/2938; G02B 6/29368; G02B 6/4215; G02B 6/29367; H04B 10/2507; H04B 7/04; H04B 7/0456; H04J 14/04; H04J 14/02; H04J 14/0254

USPC ........................................................... 398/88
See application file for complete search history.

(56) References Cited

U.S. PATENT DOCUMENTS

| | | | | |
|---|---|---|---|---|
| 4,693,544 | A * | 9/1987 | Yamasaki | G02B 6/29364 385/47 |
| 5,119,454 | A * | 6/1992 | McMahon | G02B 6/4246 359/290 |
| 5,583,683 | A * | 12/1996 | Scobey | G02B 6/29367 398/79 |
| 5,786,915 | A * | 7/1998 | Scobey | G02B 26/001 398/79 |
| 5,859,717 | A * | 1/1999 | Scobey | G02B 6/29367 398/79 |
| 6,008,920 | A * | 12/1999 | Hendrix | G02B 6/29367 398/79 |
| 8,488,244 | B1 * | 7/2013 | Li | G02B 6/4215 398/79 |

(Continued)

FOREIGN PATENT DOCUMENTS

| | | | | |
|---|---|---|---|---|
| JP | | 3997915 B2 * | 10/2007 | |
| WO | WO-2022076539 A1 * | | 4/2022 | G02B 6/3608 |

*Primary Examiner* — Abbas H Alagheband
(74) *Attorney, Agent, or Firm* — Patterson + Sheridan, LLP

(57) ABSTRACT

Aspects described herein include an optical apparatus comprising a plurality of light-carrying media, a wavelength division multiplexing (WDM) device optically coupled with the plurality of light-carrying media, and a lens arranged between the WDM device and a multicore optical fiber. An arrangement of the plurality of light carrying media and the WDM device are selected to align each of the plurality of light-carrying media with a respective optical core of the multicore optical fiber.

19 Claims, 6 Drawing Sheets

(56) References Cited

U.S. PATENT DOCUMENTS

| | | | |
|---|---|---|---|
| 2002/0018627 A1* | 2/2002 | Kato | H01S 5/02216 385/92 |
| 2003/0215240 A1* | 11/2003 | Grann | G02B 6/4215 398/85 |
| 2004/0013431 A1* | 1/2004 | Vail | H04B 10/506 398/84 |
| 2009/0097847 A1* | 4/2009 | Hosomi | G02B 6/4246 398/43 |
| 2011/0026123 A1* | 2/2011 | Lee | G02B 27/145 359/590 |
| 2015/0085351 A1* | 3/2015 | Fontaine | H01S 3/094065 359/341.3 |
| 2015/0116838 A1* | 4/2015 | Wang | H04J 14/02 359/634 |
| 2019/0018253 A1* | 1/2019 | Schreiber | G02B 27/4277 |
| 2020/0204260 A1* | 6/2020 | Wang | G02B 6/4246 |
| 2020/0379182 A1* | 12/2020 | Gui | C03C 27/048 |
| 2020/0408993 A1* | 12/2020 | Nakayama | G02B 6/421 |
| 2022/0099901 A1* | 3/2022 | Schlepple | G02B 6/4227 |

\* cited by examiner

COUPLING MULTIPLE OPTICAL CHANNELS USING A Z-BLOCK

TECHNICAL FIELD

Embodiments presented in this disclosure generally relate to optical devices, and more specifically, to techniques for coupling a multi-channel laser to a multicore optical fiber.

BACKGROUND

To support increased bandwidth requirements, optical devices may include increasing numbers of optical channels. However, using single-channel optical fibers such as single-mode fiber (SMF) or polarization-maintaining fiber (PMF) for the multiple optical channels occupies a large volume for fiber management, as well as reduces the channel density at the fiber termination, which may require increased packaging size and/or may affect the spacing of components within packaging of a given size.

Multicore fibers can significantly reduce a fiber count within the packaging, and in some cases may have a same outer diameter as single-mode optical fibers. However, solutions for optical coupling with the optical cores of the multicore fiber, such as photonic light-wave circuits that fan-in to the relatively small pitch between the optical cores, may impose significant material and/or process costs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
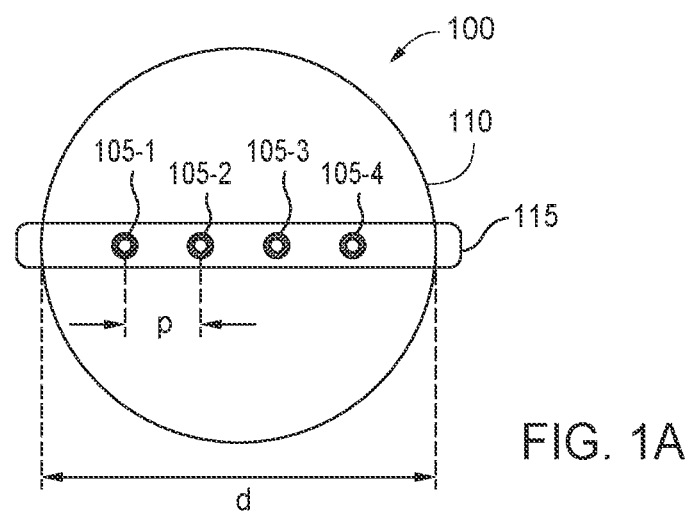
FIGS. 1A, 1B, and 1C illustrate implementations of a multicore optical fiber, according to one or more embodiments.

One embodiment presented in this disclosure is an optical apparatus comprising a plurality of light-carrying media, a wavelength division multiplexing (WDM) device optically coupled with the plurality of light-carrying media, and a lens arranged between the WDM device and a multicore optical fiber. An arrangement of the plurality of light carrying media and the WDM device are selected to align each of the plurality of light-carrying media with a respective optical core of the multicore optical fiber.

Another embodiment presented in this disclosure is a Z-block comprising a first surface in a first plane, a plurality of wavelength filters arranged at the first surface, and a second surface in a second plane. A first portion of the second surface is optically reflective, and a second portion of the second surface is optically transmissive. An arrangement of the plurality of wavelength filters and an angle between the first plane and the second plane are selected to align a first plurality of light-carrying media facing the first surface, through the second portion, with a second plurality of light-carrying media facing the second surface.

Another embodiment presented in this disclosure is a method of fabricating an optical apparatus, the method comprising arranging a laser die on a substrate. The laser die has multiple channels each configured to generate a respective optical signal at a respective wavelength. The method further comprises arranging a Z-block on the substrate. The Z-block comprises an input surface in a first plane and an output surface in a second plane. The method further comprises aligning a multicore optical fiber to the Z-block through a lens. A pitch between adjacent channels of the laser die and an angle between the first plane and the second plane are selected to align each optical core of the multicore optical fiber with a respective channel of the laser die.

Example Embodiments

Solutions for optical coupling with a multicore optical fiber include photonic light-wave circuits, which fan-in from separate optical channels to the relatively small pitch between the cores of the multicore fiber. However, implementations of optical devices using photonic light-wave circuits tend to occupy a relatively large volume, and/or may impose significant material and/or process costs.

In some embodiments, an optical apparatus comprises a plurality of light-carrying media, a WDM device such as a Z-block, and a lens optically coupled with a multicore optical fiber. The Z-block comprises an input surface in a first plane and an output surface in a second plane. A first surface of the Z-block faces the plurality of light-carrying media, and a second surface of the Z-block faces the lens. A pitch between adjacent light-carrying media and an angle between the first plane and the second plane are selected to align each of the plurality of light-carrying media with a respective optical core of the multicore optical fiber. In some embodiments, the optical apparatus may be implemented using an alternate type of wavelength-division multiplexing (WDM) device.

Beneficially, the optical apparatus provides a low-cost method for coupling discrete laser sources to the multicore optical fiber that is highly resilient to manufacturing and assembly tolerances. The optical apparatus may increase package density and/or value by supporting multiple optical channels without requiring a corresponding increase in package size. Further, the optical apparatus may be fabricated without requiring substantial modifications to existing bills of materials, assemblies, processes, or equipment for CWDM optics packaging.

Figure 1B:
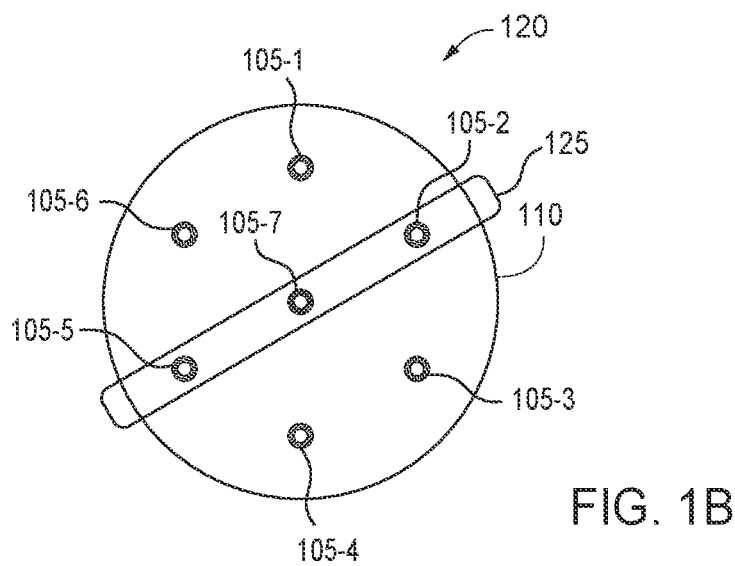
Figure 1C:
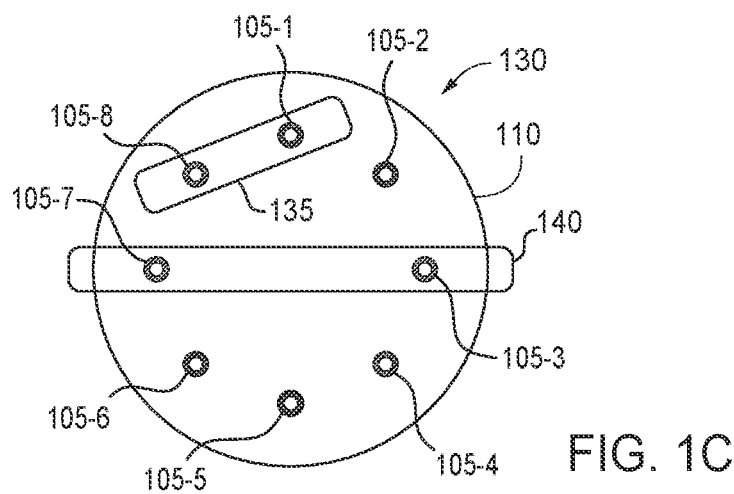

FIGS. 1A, 1B, and 1C illustrate implementations of a multicore optical fiber, according to one or more embodiments. More specifically, FIG. 1A represents a cross-section view (or an end view) of a multicore optical fiber 100 comprising a plurality of optical cores 105-1, 105-2, 105-3, 105-4 (also referred to herein as "cores") and a cladding 110. The cores 105-1, 105-2, 105-3, 105-4 and the cladding 110 may be formed of any materials providing suitable refractive indices, as will be understood by the person of ordinary skill in the art. The cores 105-1, 105-2, 105-3, 105-4 are arranged along a line within the plane depicted in FIG. 1A (also referred to herein as the planar arrangement of the cores 105-1, 105-2, 105-3, 105-4).

Although the multicore optical fiber 100 includes four (4) cores in a linear arrangement, alternative numbers and/or alternative planar arrangements of the cores 105-1, 105-2, 105-3, 105-4 are also contemplated. For example, FIG. 1B represents a cross-section view (or an end view) of a multicore optical fiber 120 comprising seven (7) cores 105-1, 105-2, . . . , 105-7 in a star-shaped planar arrangement. FIG. 1C represents a cross-section view (or an end view) of a multicore optical fiber 130 comprising eight cores 105-1, 105-2, . . . , 105-8 in a circular planar arrangement (e.g., where the cores 105-1, 105-2, . . . , 105-8 are evenly spaced with different radial angles). Other regular and/or irregular planar arrangements are also contemplated (e.g., rectangular). Further, in some embodiments the multicore optical fibers 100, 120, 130 may include one or more elements (e.g., stress rods) arranged relative to the cores 105-1, 105-2, . . . , 105-8 such that the multicore optical fibers 100, 120, 130 are polarization-maintaining multicore optical fibers.

The multicore optical fibers 100, 120, 130 may have any suitable dimensioning. In one embodiment, the multicore optical fibers 100, 120, 130 have an outer diameter d of about 125 microns, although other values are also contemplated. Generally, adjacent cores 105-1, 105-2, . . . , 105-8 may have any suitable spacing within the multicore optical fibers 100, 120, 130. In some embodiments, a pitch p between adjacent cores 105-1, 105-2, . . . , 105-8 may be as large as permitted by the outer diameter d of the multicore optical fibers 100, 120, 130, as larger spacing may be effective to mitigate interference between optical signals carried on the adjacent cores 105-1, 105-2, . . . , 105-8. In one embodiment, corresponding to the outer diameter d of about 125 microns, the pitch p between adjacent cores 105-1, 105-2, . . . , 105-8 may be in the tens of microns (e.g., between about 20 microns and about 30 microns).

When optically aligning any of the multicore optical fibers 100, 120, 130 with a multi-channel laser die, an angular alignment of the cores 105-1, 105-2, . . . , 105-8 (e.g., relative alignment of the cores 105-1, 105-2, . . . , 105-8 within the plane of the planar arrangement) may be performed using two or more of the cores 105-1, 105-2, . . . , 105-8 that are arranged in a line. Any suitable number of the cores 105-1, 105-2, . . . , 105-8 are contemplated. For example, four (4) cores 105-1, 105-2, 105-3, 105-4 (shown as angular alignment group 115) may be used for angular alignment of the multicore optical fiber 100, three (3) cores 105-2, 105-5, 105-7 (shown as angular alignment group 125) may be used for the multicore optical fiber 120, and two (2) cores 105-3, 105-7 (shown as angular alignment group 140) may be used for the multicore optical fiber 130. Notably, not all of the cores 105-1, 105-2, . . . , 105-8 arranged in a particular line need be used for angular alignment (e.g., selecting two or three of the cores 105-1, 105-2, 105-3, 105-4 for the multicore optical fiber 100), and the selected ones of the cores 105-1, 105-2, . . . , 105-8 need not be adjacent to each other within the line. Further, the line in which the cores 105-1, 105-2, . . . , 105-8 are arranged need not pass through a center of the multicore optical fibers 100, 120, 130, as with the angular alignment group 135 comprising the cores 105-1, 105-8.

Figure 2:
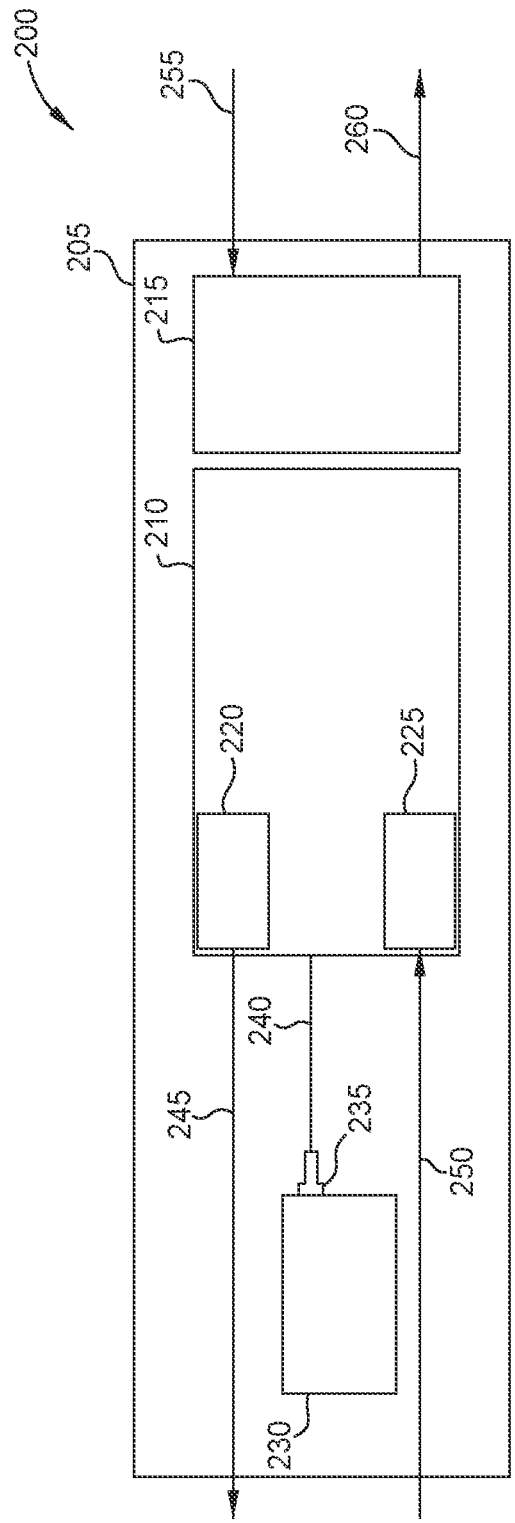
FIG. 2 is a diagram of a four-channel transmitter, according to one or more embodiments.

FIG. 2 is a diagram 200 of a four-channel transmitter 205, according to one or more embodiments. The features shown in the diagram 200 may be used in conjunction with other embodiments described herein. For example, the four-channel transmitter 205 may be implemented with a remote laser source 230 that couples multiple laser channels with a multicore optical fiber 240, some non-limiting examples of which are described with respect to FIGS. 1A-1C.

The four-channel transmitter 205 comprises a photonic integrated circuit (IC) 210 that is electrically coupled with an electronic IC 215. The photonic IC 210 includes one or more active optical devices, such as lasers, photodetectors, modulators, and absorbers. In some embodiments, the photonic IC 210 includes transmitter hardware 220 (e.g., one or more modulators) configured to transmit one or more optical signals 245 (e.g., one or more modulated optical signals), and receiver hardware 225 (e.g., one or more photodetectors) configured to receive one or more optical signals 250 (e.g., one or more modulated optical signals). The photonic IC 210 may further include one or more electronic devices, such as switches and amplifiers.

The electronic IC 215 is configured to communicate electrical signals with the photonic IC 210. In some embodiments, the electronic IC 215 includes receiver hardware configured to receive one or more electrical signals 255 and transmitter hardware configured to transmit one or more electrical signals 260. The electronic IC 215 may further include one or more drivers configured to drive electrical signals to the photonic IC 210, e.g., to control operation of the transmitter hardware 220 and/or the receiver hardware 225.

In some embodiments, the photonic IC 210 comprises a bulk silicon (Si) substrate in which one or more features or materials for the active optical device to be produced (e.g., a laser, detector, modulator, absorber) are pre-processed. In some embodiments, the photonic IC 210 is formed as a silicon-on-insulator (SOI) device comprising a substrate, a buried insulator layer (or buried oxide (BOX) layer), and a surface layer into which components of the active optical device are formed. The thickness of the surface layer may range from less than 100 nanometers to greater than a micron. More specifically, the surface layer may be between 100-300 nanometers thick. The thickness of the insulation layer may vary depending on the desired application. In one embodiment, the thickness of the insulation layer may range from less than one micron to tens of microns. The thickness of the substrate may vary widely depending on the specific application. For example, the semiconductor substrate may be the thickness of a typical semiconductor wafer (e.g., 100-700 microns) or may be thinned and mounted on another substrate.

In some embodiments, the electronic IC 215 may be implemented in a semiconductor substrate, such as a Si substrate or a SOI device. In some embodiments, the electronic IC 215 and the photonic IC 210 are attached to a common substrate providing electrical connections therebetween. In some embodiments, the photonic IC 210 is attached to a surface of the electronic IC 215.

The remote laser source 230 may be connected with an optical connector 235 or multicore fiber pigtail that optically aligns the optical cores of a multicore optical fiber 240 with optical components of the photonic IC 210. In some embodiments, the remote laser source 230 comprises a laser die having multiple channels each configured to generate a respective optical signal (e.g., a continuous wave (CW) optical signal or a directly modulated (DM) signal) at a respective wavelength. The transmitter hardware 220 may modulate the optical signals to generate the one or more optical signals 245. Although described in terms of a four-channel transmitter 205, the remote laser source 230 may alternately be configured to generate optical signals according to a different wavelength-division multiplexing scheme, to generate modulated optical signals, and so forth.

Figure 3:
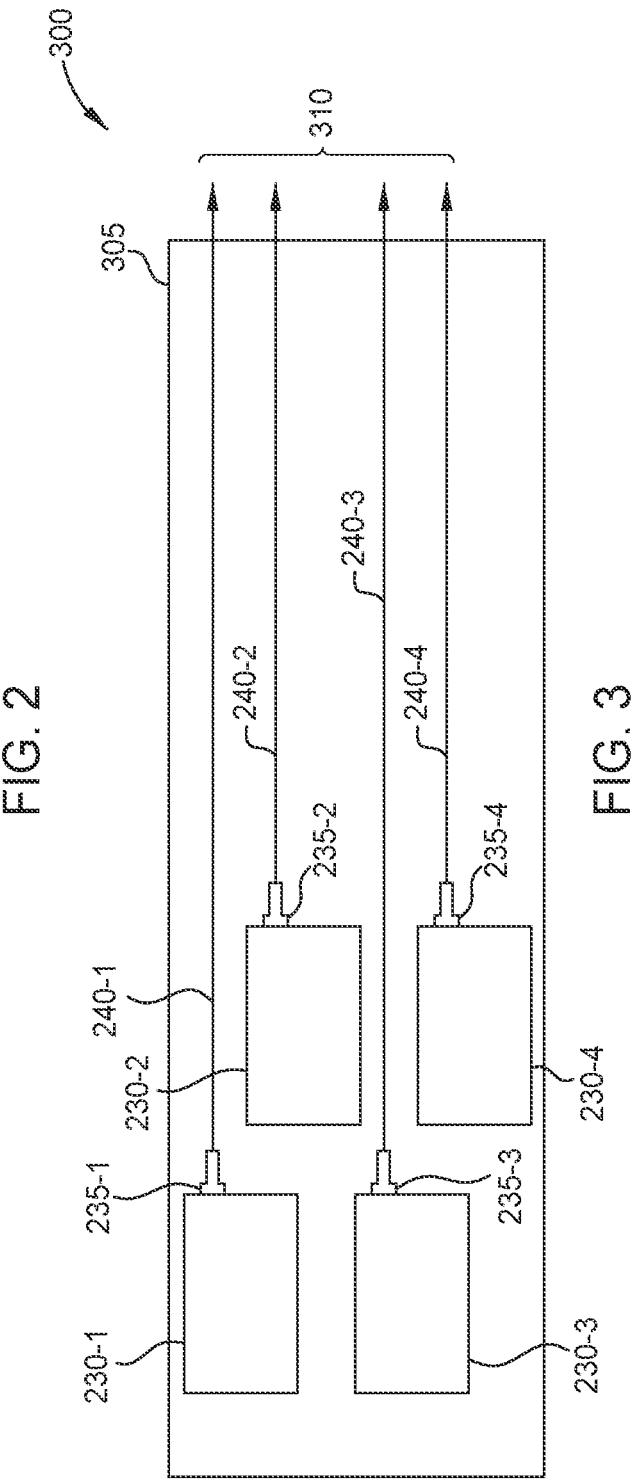
FIG. 3 is a diagram of a laser module unit, according to one or more embodiments.

FIG. 3 is a diagram 300 of a laser module unit 305, according to one or more embodiments. The features shown in FIG. 3 may be used in conjunction with other embodiments described herein. As shown, the laser module unit 305 comprises a plurality of remote laser sources 230-1, 230-2, 230-3, 230-4. Each remote laser source 230-1, 230-2, 230-3, 230-4 may be connected with a respective optical connector 235-1, 235-2, 235-3, 235-4 (or multicore fiber pigtail) that optically aligns the optical cores of a multicore optical fiber 240-1, 240-2, 240-3, 240-4 with optical outputs 310.

Figure 4:
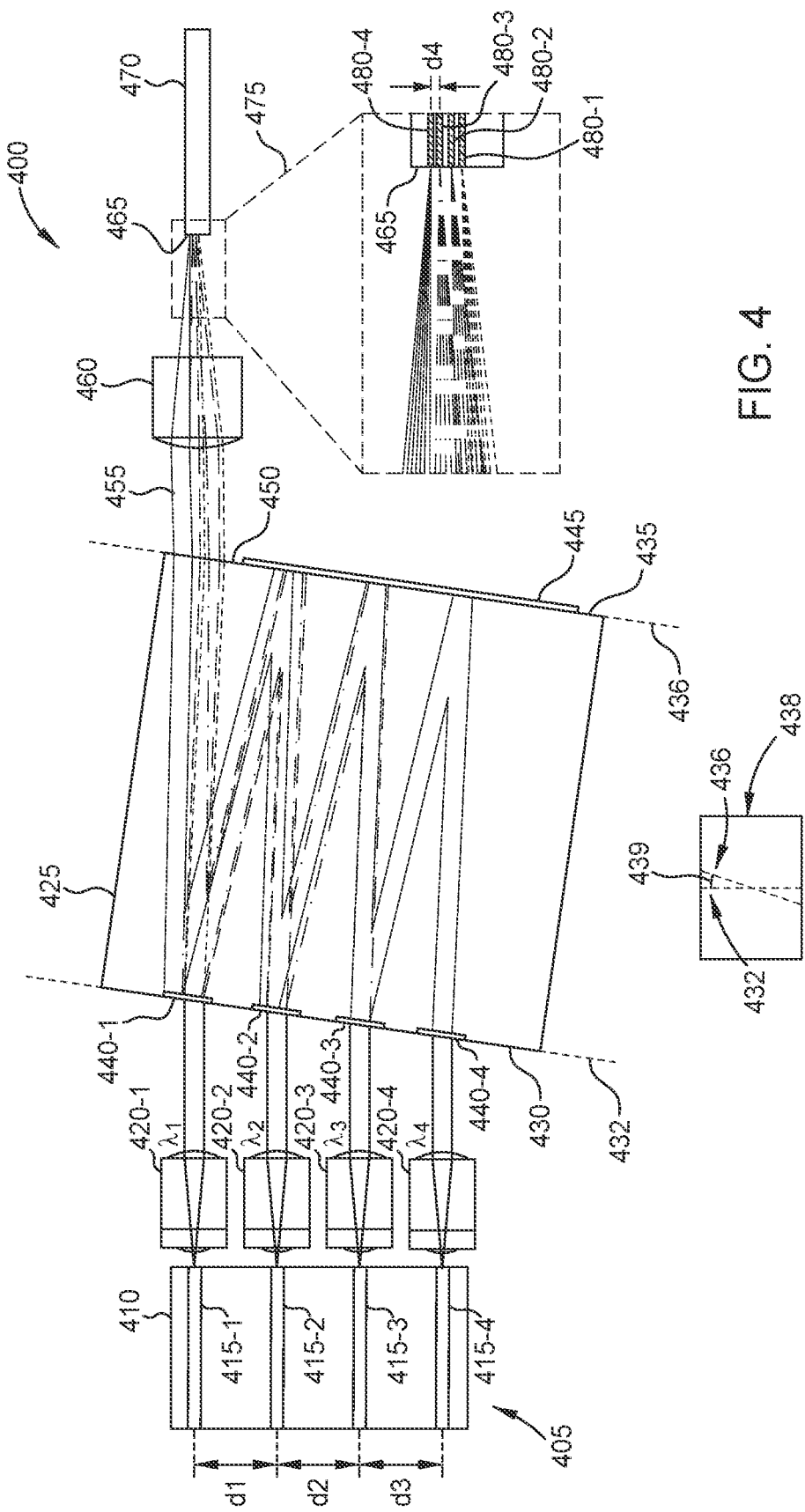
FIG. 4 illustrates an optical apparatus having a Z-block with non-parallel input and output surfaces, according to one or more embodiments.

FIG. 4 illustrates an optical apparatus 400 having a Z-block 425 with non-parallel surfaces 430, 435, according to one or more embodiments. The features shown in FIG. 4 may be used in conjunction with other embodiments described herein. For example, the optical apparatus 400 may represent the coupling of the remote laser source 230 with the multicore optical fiber 240 depicted in FIG. 2.

The optical apparatus 400 comprises a laser die 405 having a plurality of laser channels 415-1, 415-2, 415-3, 415-4 (collectively or generically, laser channel(s) 415) on a substrate 410, a plurality of lenses 420-1, 420-2, 420-3, 420-4 (collectively or generically, lens(es) 420), the Z-block 425, a lens 460, and a multicore optical fiber 470. The laser channels 415-1, 415-2, 415-3, 415-4 generate CW optical signals at respective wavelengths $\lambda_1$, $\lambda_2$, $\lambda_3$, $\lambda_4$. In some embodiments, the wavelengths $\lambda_1$, $\lambda_2$, $\lambda_3$, $\lambda_4$ are selected according to a CWDM scheme. The CW optical signals are collimated by respective lenses 420 and are incident on a first surface 430 of the Z-block 425.

As shown, adjacent laser channels 415-1, 415-2 are spaced apart by a pitch d1, adjacent laser channels 415-2, 415-3 are spaced apart by a pitch d2, and adjacent laser channels 415-3, 415-4 are spaced apart by a pitch d3. In some embodiments, the pitches d1, d2, d3 have a same value. One non-limiting example of the value of the pitches d1, d2, d3 is about 1000 microns, although other suitable values are also contemplated. In other embodiments, different pairs of the adjacent laser channels 415 may have different pitch values from each other.

The Z-block 425 may be formed of any suitable optically transmissive material, such as glass. The first surface 430 is in a first plane 432, and the second surface is in a second plane 436. A plurality of wavelength filters 440-1, 440-2, 440-3, 440-4 are arranged at the first surface 430, and each wavelength filter 440-1, 440-2, 440-3, 440-4 is configured to transmit the respective wavelength $\lambda_1$, $\lambda_2$, $\lambda_3$, $\lambda_4$ while reflecting other wavelengths. The Z-block 425 further comprises a second surface 435 opposing the first surface 430. A first portion 445 of the second surface 435 is optically reflective, and a second portion 450 of the second surface 435 is optically transmissive.

In the implementation of the optical apparatus 400 shown in FIG. 4, the first surface 430 operates as an input surface of the Z-block 425 (i.e., at which a plurality of optical signals are received from the laser channels 415), and the second surface 435 operates as an output surface of the Z-block 425 (i.e., transmitting the plurality of optical signals after several passes through the Z-block 425). In this way, the optical apparatus 400 is configured to operate as a four-channel transmitter. However, in an alternate implementation of the optical apparatus 400, the optical apparatus 400 may be configured to operate as a four-channel receiver, in which the second surface 435 operates as an input surface (e.g., at which optical signals from the multicore optical fiber 470 are received) and the first surface 430 operates as an output surface. In the receiver configuration, each of the laser channels 415 may be replaced by a respective photodiode. In another alternate implementation of the optical apparatus 400, the optical apparatus 400 may be configured to operate as a transceiver. For example, two channels may be configured as transmitter channels (having two laser channels 415), and two channels may be configured as receiver channels (having two photodiodes substituted for two laser channels 415).

In some embodiments, a pitch between adjacent light-carrying media (here, adjacent ones of the laser channels 415) and an angle 439 between the first plane 432 and the second plane 436 (shown in an inset portion 438) are selected to align each of the laser channels 415 with a respective one of the optical cores 480-1, 480-2, 480-3, 480-4 (generically or collectively, optical core(s) 480) of the multicore optical fiber 470. The optical cores 480 are illustrated in an inset portion 475. As shown, adjacent optical cores 480 are separated by a same value of pitch d4. However, alternate implementations of the multicore optical fiber 470 may have different values of pitch between adjacent optical cores 480.

In some embodiments, and as shown in the optical apparatus 400 and the inset portion 438, the values of pitch d1, d2, d3 are equal and the angle 439 between the first plane 432 and the second plane 436 is non-zero. Stated another way, the first plane 432 and the second plane 436 intersect to form the angle 439 therebetween. As described herein, a "non-zero" value contemplates any values exceeding manufacturing tolerances of the Z-block 425. In some embodiments, the angle 439 between the first plane 432 and the second plane 436 is between 0.1 and 0.5 degrees.

During exemplary operation of the optical apparatus 400, an optical signal from the laser channel 415-4 (having the wavelength $\lambda_4$) is transmitted through the wavelength filter 440-4, transmitted through the body of the Z-block 425 and incident on the first portion 445, and reflected by the first portion 445 toward the wavelength filter 440-3. In some embodiments, each of the respective optical signals have different incidence angles on the Z-block 425. Due to the angle 439 between the first plane 432 and the second plane 436, the reflected optical signal is incident on the wavelength filter 440-3 at a point offset from a point of entry of an optical signal from the laser channel 415-3 (having the wavelength $\lambda_3$) through the wavelength filter 440-3.

The optical signals with the wavelengths $\lambda_3$, $\lambda_4$ are transmitted through the body of the Z-block 425 and incident on the first portion 445, and reflected toward the wavelength filter 440-2. Again, due to the angle 439, the reflected optical signals are incident on the wavelength filter 440-2 at points offset from a point of entry of an optical signal from the laser channel 415-2 (having the wavelength $\lambda_2$) through the wavelength filter 440-2.

The optical signals with the wavelengths $\lambda_2$, $\lambda_3$, $\lambda_4$ are transmitted through the body of the Z-block 425 and incident on the first portion 445, and reflected toward the wavelength filter 440-1. Again, due to the angle 439, the reflected optical signals are incident on the wavelength filter 440-1 at points offset from a point of entry of an optical signal from the laser channel 415-1 (having the wavelength $\lambda_1$) through the wavelength filter 440-1.

The optical signals 455 with the wavelengths $\lambda_1$, $\lambda_2$, $\lambda_3$, $\lambda_4$ are transmitted through the body of the Z-block 425 and exit the Z-block 425 through the second portion 450. The optical signals with the wavelengths $\lambda_1$, $\lambda_2$, $\lambda_3$, $\lambda_4$ are transmitted through the lens 460 and received into respective optical cores 480-1, 480-2, 480-3, 480-4 at an endface 465 of the multicore optical fiber 470.

Each of the optical signals 455, generated by a respective laser channel 415 and collimated by a respective lens 420, has a different beam angle as the respective optical signal exits the Z-block 425. The beam angle depends on the number of round-trip propagations of the optical signal through the Z-block 425. For example, the optical signal with the wavelength $\lambda_1$ has no round-trip propagations (no beam angle added by the Z-block 425), the optical signal with the wavelength $\lambda_2$ has one round-trip propagation (adding 1× the angle 439), the optical signal with the wavelength $\lambda_3$ has two round-trip propagations (adding 2× the angle 439), and the optical signal with the wavelength $\lambda_4$ has three round-trip propagations (adding 3× the angle 439). The difference in the beam angles, in combination with the placement of the lens 460, leads to an equidistant focal point separation that matches the pitch d4 of the optical cores 480 of the multicore optical fiber 470. Beneficially, the optical signals are coupled into the optical cores 480 without a significant degradation (when compared to an on-axis optical system), as the angle 439 is relatively small (e.g., between 0.1 and 0.5 degrees).

In some embodiments, an eccentricity of a particular optical signal, e.g., introduced by manufacturing tolerances of the Z-block 425, may be compensated by laterally offsetting the respective lens 420 relative to the laser channel 415. Further, the lenses 420 may be arranged to compensate for assembly tolerances, such as a rotational error of the multicore optical fiber 470.

Figure 5:
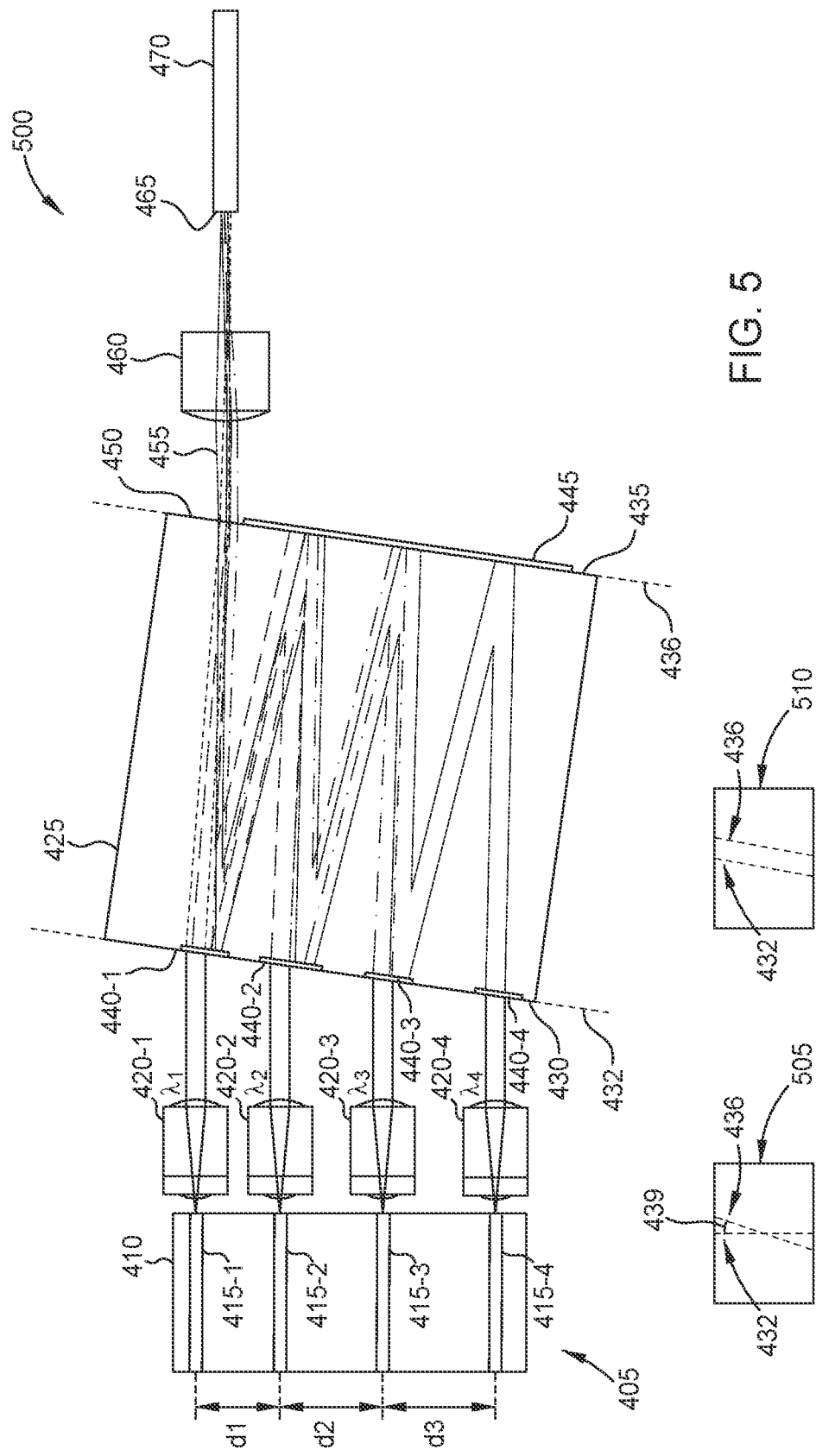
FIG. 5 illustrates an optical apparatus having a Z-block and non-parallel collimated beams as well as differing pitch between pairs of adjacent laser channels, according to one or more embodiments.

FIG. 5 illustrates an optical apparatus 500 having a Z-block 425 and differing pitch between pairs of adjacent laser channels 415, according to one or more embodiments. The features shown in FIG. 5 may be used in conjunction with other embodiments described herein. For example, the optical apparatus 500 may represent the coupling of the remote laser source 230 with the multicore optical fiber 240 depicted in FIG. 2.

As shown, the adjacent laser channels 415-1, 415-2 are spaced apart by the pitch d1, the adjacent laser channels 415-2, 415-3 are spaced apart by the pitch d2, and the adjacent laser channels 415-3, 415-4 are spaced apart by the pitch d3. In one non-limiting example, the pitch d1 is about 800 microns, the pitch d2 is about 950 microns, and the pitch d3 is about 1100 microns, although other suitable values and ratios are also contemplated. In some embodiments, the angle 439 between the first plane 432 and the second plane 436 is zero, and different pairs of the adjacent wavelength filters 440-1, 440-2, 440-3, 440-4 have a different pitch.

In some embodiments, and as shown in an inset portion 505, the angle 439 between the first plane 432 and the second plane 436 is non-zero. In other embodiments, and as shown in an inset portion 510, the angle 439 between the first plane 432 and the second plane 436 is substantially zero. Stated another way, the first plane 432 and the second plane 436 may be parallel to each other. As described herein, a "substantially zero" value contemplates a zero value, as well as any values within the manufacturing tolerances of the Z-block 425.

In some embodiments, one or more of the lenses 420 are laterally offset from the respective laser channels 415 such that the optical signals have different beam angles when exiting the Z-block 425. In some embodiments, each of the lenses 420 is laterally offset by approximately the same amount, and the beam angles at the output of the Z-block 425 differ based on the number of round-trip propagations of the optical signal through the Z-block 425. In one non-limiting example, the value of the lateral offset is between 5 and 20 microns. In other embodiments, one or more of the lenses 420 may have a different lateral offset from another one or more of the lenses 420 (which may include a zero lateral offset). For example, an eccentricity of a particular optical signal, e.g., introduced by manufacturing tolerances of the Z-block 425, may be compensated by adjusting the lateral offset of the respective lens 420 relative to the laser channel 415.

During exemplary operation of the optical apparatus 500, an optical signal from the laser channel 415-4 (having the wavelength $\lambda_4$) is transmitted through the wavelength filter 440-4, transmitted through the body of the Z-block 425 and incident on the first portion 445, and reflected by the first portion 445 toward the wavelength filter 440-3. In some embodiments, each of the respective optical signals have different incidence angles on the Z-block 425. Based on the pitch d3, a value of the angle 439 when non-zero, and any lateral offsets between the laser channel 415-4, 415-3 and the respective lens 420-4, 420-3, the reflected optical signal is incident on the wavelength filter 440-3 at a point offset from a point of entry of an optical signal from the laser channel 415-3 (having the wavelength $\lambda_3$) through the wavelength filter 440-3.

The optical signals with the wavelengths $\lambda_3$, $\lambda_4$ are transmitted through the body of the Z-block 425 and incident on the first portion 445, and reflected toward the wavelength filter 440-2. Based on the pitch d2, a value of the angle 439 when non-zero, and any lateral offsets between the laser channel 415-4, 415-3, 415-2 and the respective lens 420-4, 420-3, 420-2, the reflected optical signals are incident on the wavelength filter 440-2 at points offset from a point of entry of an optical signal from the laser channel 415-2 (having the wavelength $\lambda_2$) through the wavelength filter 440-2.

The optical signals with the wavelengths $\lambda_2$, $\lambda_3$, $\lambda_4$ are transmitted through the body of the Z-block 425 and incident on the first portion 445, and reflected toward the wavelength filter 440-1. Based on the pitch d1, a value of the angle 439 when non-zero, and any lateral offsets between the laser channel 415-4, 415-3, 415-2, 415-1 and the respective lens 420-4, 420-3, 420-2, 420-1, the reflected optical signals are incident on the wavelength filter 440-1 at points offset from a point of entry of an optical signal from the laser channel 415-1 (having the wavelength $\lambda_1$) through the wavelength filter 440-1.

The optical signals 455 with the wavelengths $\lambda_1$, $\lambda_2$, $\lambda_3$, $\lambda_4$ are transmitted through the body of the Z-block 425 and exit the Z-block 425 through the second portion 450. The optical signals with the wavelengths $\lambda_1$, $\lambda_2$, $\lambda_3$, $\lambda_4$ are transmitted through the lens 460 and received into the respective optical cores 480-1, 480-2, 480-3, 480-4 at the endface 465 of the multicore optical fiber 470.

The difference in the beam angles, in combination with the placement of the lens 460, leads to an equidistant focal point separation that matches the pitch d4 of the optical cores 480 of the multicore optical fiber 470. Beneficially, the optical signals are coupled into the optical cores 480 without a significant degradation (when compared to an on-axis optical system), whether the angle 439 between the first plane 432 and the second plane 436 is substantially zero or relatively small (e.g., between 0.1 and 0.5 degrees).

Beneficially, the optical apparatus 500 and the optical apparatus 400 of FIG. 4 provide a low-cost method for coupling discrete laser sources (e.g., the laser channels 415) to the multicore optical fiber 470 that is highly resilient to manufacturing and assembly tolerances. In some cases, the optical apparatus 400, 500 may be fabricated using one or more pre-existing components (e.g., a pre-existing design of the Z-block 425) from CWDM4 or LR4 TOSA platforms.

For a particular type of packaging, the optical apparatus 400, 500 may increase package density and/or value by supporting multiple optical channels without requiring a corresponding increase in package size. Further, the optical apparatus 400, 500 may be fabricated without requiring substantial modifications to existing bills of materials, assemblies, processes, or equipment for CWDM optics packaging. Still further, when integrated into the four-channel transmitter 205 of FIG. 2 (e.g., in the remote laser source 230), the optical apparatus 400, 500 enables the photonic IC 210 to be implemented without corresponding WDM circuitry, which generally corresponds to reduced optical losses at the photonic IC 210.

Although the optical apparatus 400, 500 depict the plurality of laser channels 415-1, 415-2, 415-3, 415-4 providing optical signals to the multicore optical fiber 470, alternate implementations of the optical apparatus 400, 500 may include different type(s) and/or combination(s) of light-carrying media. Some non-limiting examples include coupling optical waveguides with a multicore optical fiber, coupling laser channels with optical waveguides, and so forth. Further, alternate implementations of the optical apparatus 400, 500 may receive optical signals at the second surface 435 (e.g., via the multicore optical fiber 470) and transmit the optical signals through the first surface 430 (e.g., to optical waveguides).

Although the optical apparatus 400, 500 depict the first surface 430 and the second surface 435 as being single planar surfaces, alternate implementations of the optical apparatus 400, 500 may include the first surface 430 and/or the second surface 435 as being non-planar and/or multiple surfaces. Further, although the optical apparatus 400, 500 depict four optical channels between the laser channels 415 and the multicore optical fiber 470, alternate implementations of the optical apparatus 400, 500 may include different numbers of optical channels.

Figure 6:
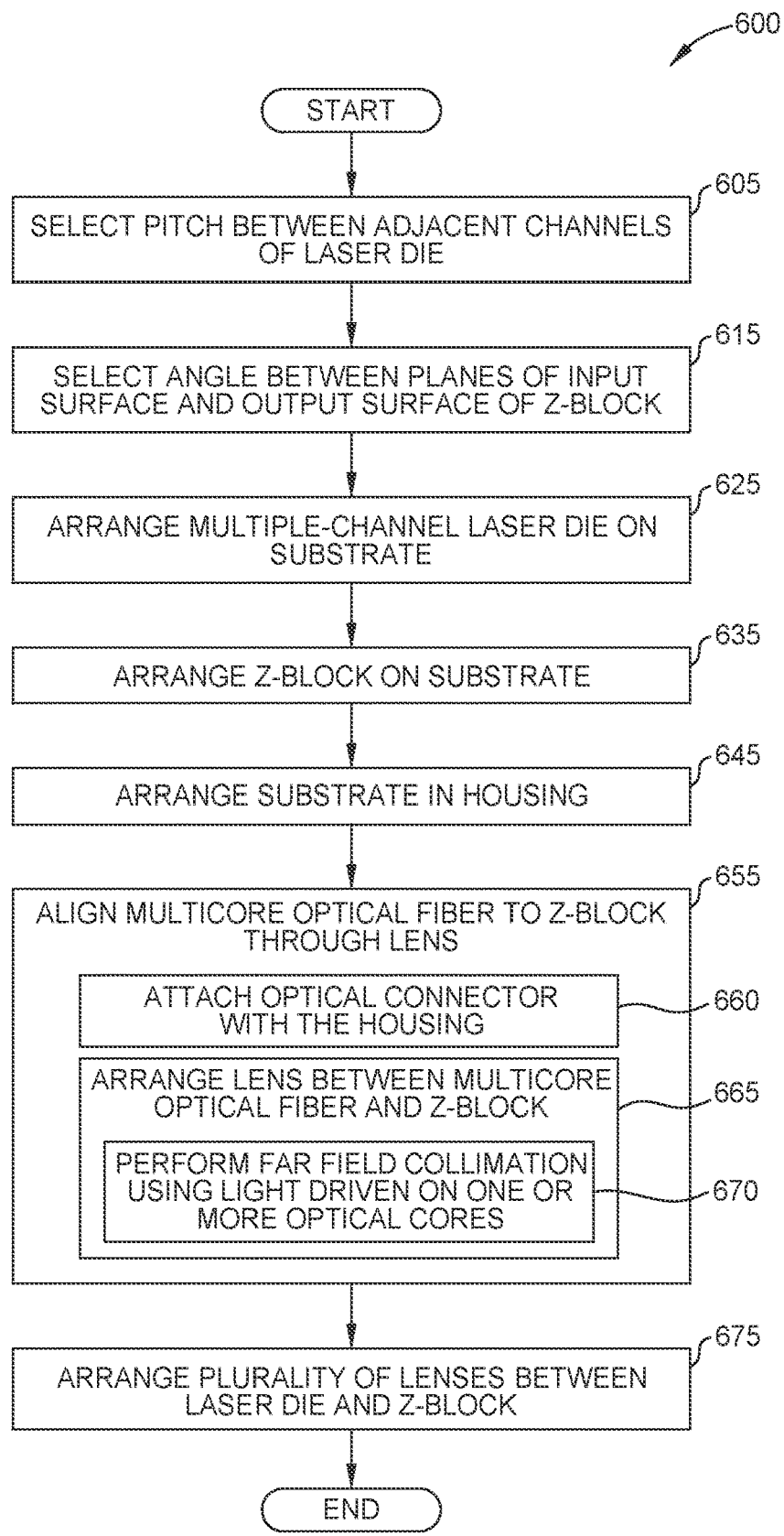
FIG. 6 is a method of fabricating an optical apparatus, according to one or more embodiments.
Figure 7:
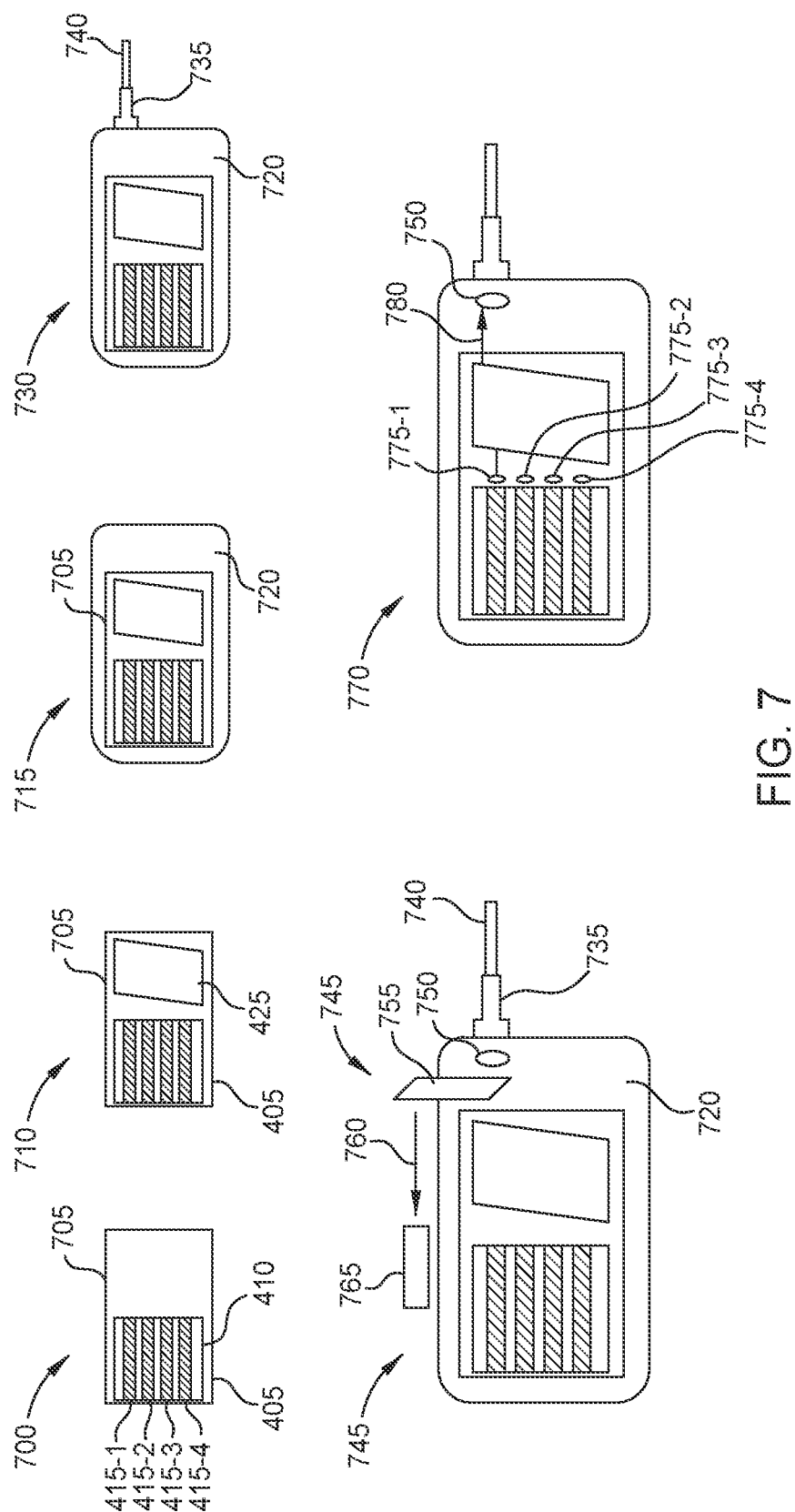
FIG. 7 illustrates a sequence of fabricating an optical apparatus, according to one or more embodiments.

FIG. 6 is a method 600 of fabricating an optical apparatus, according to one or more embodiments. The method 600 may be used in conjunction with other embodiments described herein, e.g., to fabricate the optical apparatus 400, 500 of FIGS. 4, 5. Further, the method 600 will be described with respect to FIG. 7.

The method 600 begins at block 605, where a pitch is selected between adjacent channels of a laser die. In some embodiments, the different pairs of adjacent channels have a same pitch. In other embodiments, the different pairs of adjacent channels have a different pitch. At block 615, an angle is selected between a first plane of an input surface and a second plane of an output surface of a Z-block. In some embodiments, the angle is substantially zero. In other embodiments, the angle is non-zero.

At block 625, a multiple-channel laser die is arranged on a substrate. Referring to diagram 700, the substrate 410 of the laser die 405 is arranged on a substrate 705. In some embodiments, the laser die 405 is electrically connected to the substrate 705. At block 635, a Z-block is arranged on the substrate. Referring to diagram 710, the Z-block 425 is arranged on the substrate 705. At block 645, the substrate is arranged in a housing. As shown in diagram 715, the substrate 705 is attached to a housing component 720. Some non-limiting examples of the housing component 720 include rectangular packages formed of Kovar, stainless steel, or copper tungsten (CuW). In some embodiments, the substrate 705 is attached to the housing component 720 after arranging the laser die 405 and/or the Z-block 425 on the substrate 705. In other embodiments, the substrate 705 is attached to the housing component 720 before arranging the laser die 405 and/or the Z-block 425 on the substrate 705.

At block 655, a multicore optical fiber is aligned to the Z-block through a lens. In some embodiments, and as shown in diagram 730, aligning the multicore optical fiber comprises attaching an optical connector 735 with the housing (e.g., the housing component 720) (block 660). The optical connector 735 is attached to a multicore optical fiber 740. Some non-limiting examples of the optical connector 735 include a receptacle and a pigtail.

In some embodiments, and as shown in diagram 745, aligning the multicore optical fiber comprises arranging a lens 750 between the multicore optical fiber 740 and the Z-block 425 (block 665). In some embodiments, arranging the lens 750 between the multicore optical fiber 740 and the Z-block 425 comprises performing far field collimation using light driven on one or more optical cores (block 670). For example, performing far field collimation comprises arranging an optical periscope 755 relative to the lens 750, driving optical signals 760 onto one or more optical cores of the multicore optical fiber 740, and measuring the optical signals 760 using an infrared (IR) camera 765. In some embodiments, the one or more optical cores are fewer than all of the optical cores of the multicore optical fiber 740 (e.g., the two outermost optical cores). In some embodiments, the positioning and/or rotation of the lens 750 and/or the multicore optical fiber 740 may be adjusted based on the far field collimation.

At block 675, and as shown in diagram 770, a plurality of lenses 775-1, 775-2, 775-3, 775-4 are arranged between the laser die 405 and the Z-block 425. In some embodiments, the lenses 775-1, 775-2, 775-3, 775-4 may be laterally offset from the respective laser channels 415-1, 415-2, 415-3, 415-4 to introduce a beam angle at an input surface of the Z-block 425. One or more optical signals 780 are driven may be driven by the laser channels 415-1, 415-2, 415-3, 415-4 and measured. In some embodiments, the lenses 775-1, 775-2, 775-3, 775-4 may be adjusted to compensate for manufacturing and/or assembly tolerances. The method 600 ends following completion of block 675.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim (s).

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical apparatus comprising:
a plurality of light-carrying media;
a wavelength division multiplexing (WDM) device optically coupled with the plurality of light-carrying media, wherein the WDM device comprises a Z-block comprising an input surface in a first plane and an output surface in a second plane, wherein a first surface of the Z-block faces the plurality of light-carrying media; and
a lens arranged between the WDM device and a multicore optical fiber, wherein a second surface of the Z-block faces the lens, and wherein a pitch between adjacent light-carrying media of the plurality of light-carrying media and an angle between the first plane and the second plane are selected to align each of the plurality of light-carrying media with a respective optical core of the multicore optical fiber.

2. The optical apparatus of claim 1, wherein the plurality of light-carrying media comprises a plurality of laser sources.

3. The optical apparatus of claim 1, wherein the plurality of light-carrying media comprises a plurality of optical waveguides or a plurality of photodiodes.

4. The optical apparatus of claim 1,
wherein the input surface is the first surface,
wherein the plurality of light-carrying media comprises a plurality of laser sources, each laser source configured to generate a respective optical signal, and
wherein the multicore optical fiber is configured to receive the respective optical signals at respective optical cores.

5. The optical apparatus of claim 1,
wherein the input surface is the second surface,
wherein each of the respective optical cores of the multicore optical fiber is configured to output a respective optical signal at a respective wavelength, and
wherein the plurality of light-carrying media comprises a plurality of optical waveguides or a plurality of photodiodes, each optical waveguide or photodiode configured to receive a respective one of the respective optical signals.

6. The optical apparatus of claim 1, further comprising:
a plurality of lenses arranged between the plurality of light-carrying media and the first surface of the Z-block.

7. The optical apparatus of claim 1,
wherein the angle is substantially zero, and
wherein different pairs of adjacent light-carrying media have a different pitch, or respective optical signals have different incidence angles on the Z-block.

8. The optical apparatus of claim 1, wherein the angle is non-zero.

9. The optical apparatus of claim 8, wherein different pairs of adjacent light-carrying media have a different pitch, or respective optical signals have different incidence angles on the Z-block.

10. A method of fabricating an optical apparatus, the method comprising:
arranging a laser die on a substrate, wherein the laser die has multiple channels each configured to generate a respective optical signal at a respective wavelength;
arranging a Z-block on the substrate, the Z-block comprising an input surface in a first plane and an output surface in a second plane; and
aligning a multicore optical fiber to the Z-block through a lens,
wherein a pitch between adjacent channels of the laser die and an angle between the first plane and the second plane are selected to align each optical core of the multicore optical fiber with a respective channel of the laser die.

11. The method of claim 10, further comprising:
arranging the substrate in a housing,
wherein the multicore optical fiber is attached to an optical connector, and
wherein aligning the multicore optical fiber to the Z-block through the lens comprises:
attaching the optical connector with the housing; and
arranging the lens between the multicore optical fiber and the Z-block.

12. The method of claim 11, wherein arranging the lens between the multicore optical fiber and the Z-block comprises performing far field collimation using light driven on one or more optical cores of the multicore optical fiber.

13. The method of claim 11, further comprising:
arranging, after arranging the lens between the multicore optical fiber and the Z-block, a plurality of lenses between the laser die and the Z-block.

14. The method of claim 10,
wherein the angle is substantially zero, and
wherein different pairs of adjacent channels of the laser die have a different pitch, or respective optical signals have different incidence angles on the Z-block.

15. The method of claim 10, wherein the angle is non-zero.

16. An optical apparatus comprising:
a plurality of light-carrying media;
a wavelength division multiplexing (WDM) device optically coupled with the plurality of light-carrying media, wherein the WDM device comprises a Z-block having an input surface in a first plane and an output surface in a second plane, wherein a first surface of the Z-block faces the plurality of light-carrying media; and
a lens arranged between the WDM device and a multicore optical fiber, wherein a second surface of the Z-block faces the lens,
wherein an angle between the first plane and the second plane is non-zero, or wherein the angle is substantially zero and different pairs of adjacent light-carrying media of the plurality of the light-carrying media have a different pitch, and
wherein each of the plurality of light-carrying media is aligned with a respective optical core of the multicore optical fiber.

17. The optical apparatus of claim 16, wherein the plurality of light-carrying media comprises a plurality of laser sources.

18. The optical apparatus of claim 16, wherein the plurality of light-carrying media comprises a plurality of optical waveguides or a plurality of photodiodes.

19. The optical apparatus of claim 16,
wherein the input surface is the first surface,
wherein the plurality of light-carrying media comprises a plurality of laser sources, each laser source configured to generate a respective optical signal, and
wherein the multicore optical fiber is configured to receive the respective optical signals at respective optical cores.

* * * * *